(12) United States Patent
Manzano et al.

(10) Patent No.: US 12,277,133 B2
(45) Date of Patent: Apr. 15, 2025

(54) AUTOMATIC DATA LINTING RULES FOR ETL PIPELINES

(71) Applicant: Salesforce, Inc., San Francisco, CA (US)

(72) Inventors: Ignacio Agustin Manzano, Buenos Aires (AR); Subhash Periasamy, Newark, CA (US); Berkay Polat, Redwood City, CA (US); Anand Nair, Mountain House, CA (US); Udayakumar Dhansingh, Dublin, CA (US); Vijay Gopalakrishnan, Seattle, WA (US); Saebom Kwon, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/080,268

(22) Filed: Dec. 13, 2022

(65) Prior Publication Data

US 2024/0193174 A1 Jun. 13, 2024

(51) Int. Cl.
 *G06F 16/20* (2019.01)
 *G06F 16/25* (2019.01)
(52) U.S. Cl.
 CPC .................. *G06F 16/254* (2019.01)
(58) Field of Classification Search
 CPC .................................................. G06F 16/254
 See application file for complete search history.

(56) References Cited

U.S. PATENT DOCUMENTS

| | | | |
|---|---|---|---|
| 7,958,165 B1 * | 6/2011 | Devanathan .......... | G06F 16/288 707/810 |
| 10,083,215 B2 * | 9/2018 | Davis Jones ......... | G06F 16/258 |
| 2009/0144319 A1 * | 6/2009 | Panwar .................. | G06F 16/25 707/999.102 |
| 2012/0089562 A1 * | 4/2012 | Deremigio ............ | G06F 16/254 707/703 |
| 2013/0185050 A1 * | 7/2013 | Bird ..................... | G06F 16/3329 704/E11.001 |
| 2014/0279828 A1 * | 9/2014 | Choudhary ........... | G06F 16/211 707/602 |
| 2015/0100542 A1 * | 4/2015 | Li .......................... | G06F 16/254 707/602 |
| 2017/0220606 A1 * | 8/2017 | Wang ...................... | G06N 5/04 |
| 2019/0026321 A1 * | 1/2019 | Mukhopadhyay ...... | G06F 16/23 |
| 2019/0057137 A1 * | 2/2019 | Bradham ............... | G16H 10/20 |

(Continued)

*Primary Examiner* — Tarek Chbouki
(74) *Attorney, Agent, or Firm* — Sterne, Kessler, Goldstein & Fox P.L.L.C.

(57) ABSTRACT

In the present disclosure, systems and methods are described for allowing a non-code user to create to transform a database in an ETL pipeline. Specifically, as disclosed herein, a user can take a database and receive a ruleset to apply to the database in an ETL pipeline. The data linting system may take the database and extract a schema and a data sample from it. Further, the data linting system may use the schema and data sample to create two rulesets. With these rulesets, the data linting system combines them to create a final ruleset which may be validated using the data sample. The data linting system then sends the final ruleset and the validation report to the user. With this system, the user only needs to give it a database and will receive a ruleset that is able to be immediately used in an ETL pipeline.

21 Claims, 9 Drawing Sheets

(56) References Cited

U.S. PATENT DOCUMENTS

| | | | | |
|---|---|---|---|---|
| 2019/0340291 | A1* | 11/2019 | Raman | G06F 16/184 |
| 2020/0026532 | A1* | 1/2020 | Bill | G06Q 10/087 |
| 2020/0349130 | A1* | 11/2020 | Bracholdt | G06F 16/254 |
| 2022/0179867 | A1* | 6/2022 | Pellerin | G06F 9/541 |
| 2023/0008628 | A1* | 1/2023 | Mahanta | G06F 16/211 |
| 2023/0306125 | A1* | 9/2023 | Ball | G06F 16/116 |
| 2023/0385248 | A1* | 11/2023 | Izenson | G06F 16/212 |

* cited by examiner

AUTOMATIC DATA LINTING RULES FOR ETL PIPELINES

BACKGROUND

Using an ETL/ELT/EL pipeline requires a user to have a high-level understanding of the pipeline in order to manipulate the database they need to change. To manipulate data using an ETL/ELT/EL pipeline, a user can only use tools based on specific programming languages, such as Python, or use SQL language. A user must effectively be a code developer to use these tools to manipulate the data, even when a user wants to merely validate that a field in the database is a numerical value.

BRIEF DESCRIPTION

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Using an ETL (extract, transform, load), an ELT (extract, load, transform), or an EL (extract, load) pipeline requires a user to have a high-level understanding of the pipeline in order to manipulate the database they need to change. To manipulate data using an ETL/ELT/EL pipeline, a user can only use tools based on specific programming languages, such as Python, or use SQL language. A user must effectively be a code developer to use these tools to manipulate the data, even when a user wants to merely validate that a field in the database is a numerical value. However, it is becoming more and more commonplace in various workplaces to designate these tasks to individuals without a technical/programming background. And individuals without such backgrounds often find these tasks extremely difficult, given programming is necessary aspect of these responsibilities. Consequently, a system is needed for allowing those without the necessary programming backgrounds to be able to effectively carry out these tasks.

In the present disclosure, systems and methods are described for achieving these goals. Specifically, as disclosed herein, a user can take a database and receive a ruleset to apply to the database in an ETL pipeline. In some embodiments, the system creates the rulesets based on a specific transformation language, such as SQL. In embodiments, a user agrees to some or all the rules in the ruleset created by the system. In some embodiments, the system then generates the chosen rules in the specific language chosen by the user. In embodiments, the system may transform the database based on the rules.

Provided herein are system, apparatus, device, method and/or computer program product embodiments, and/or combinations and sub-combinations thereof, for automatically generating rules for an ETL pipeline.

Figure 1:
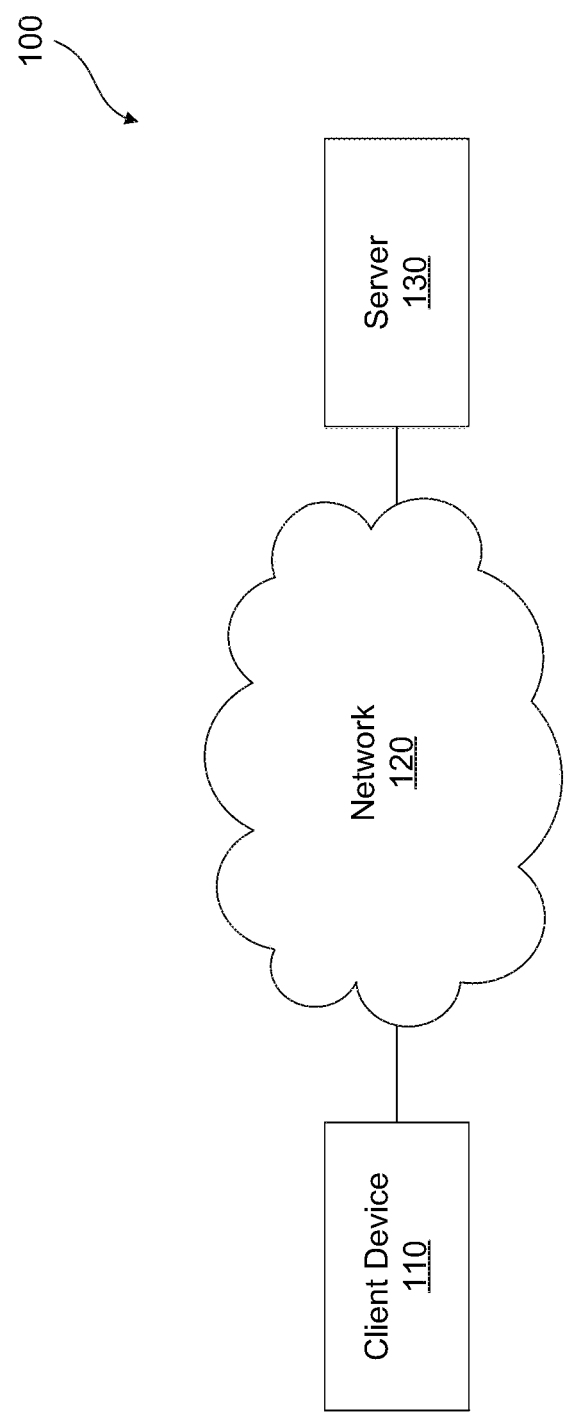
FIG. 1 illustrates a block diagram of an example linting environment according to embodiments of the present disclosure.

FIG. 1 illustrates a block diagram of an example linting environment 100 according to embodiments of the present disclosure. As shown in FIG. 1, a client device 110 is connected to one or more networks 120. In some embodiments, network 120 is connected to one or more servers 130. In various embodiments, the network 120 is one or more of a WAN, LAN, WLAN, or VLAN. The client device 110 may be a wired or wireless communication device, including but not limited to: a cellphone, desktop computer, laptop computer or any similar device with communication capability.

In some embodiments, the client device 110 provides a user interface through which a user interacts with server 130. In embodiments, server 130 hosts a number of databases. In some embodiments, server 130 and network 120 host an ETL pipeline. In some embodiments, server 130 and network 120 host an ELT pipeline.

In operation, a user uses the client device 110 to contact server 130 to create a ruleset. The client device 110 communicates with the server 130 via the network 120. The identification information of a database is sent to the server 130 from the client device 110. In embodiments, the server 130 then uses a data linting system, such as the one discussed in FIG. 2, to create a ruleset. The client device 110 then receives the ruleset and validation report from the server 130 via the network 120. A user may choose to disable rules from the ruleset. The client device 110 then communicates the disabled rules to the server 130 via the network 120. In some embodiments, the server 130 and the network 120 form an ETL pipeline which can use the ruleset and identified database to transform the database, based on the confirmed ruleset from the client device 110.

Figure 2:
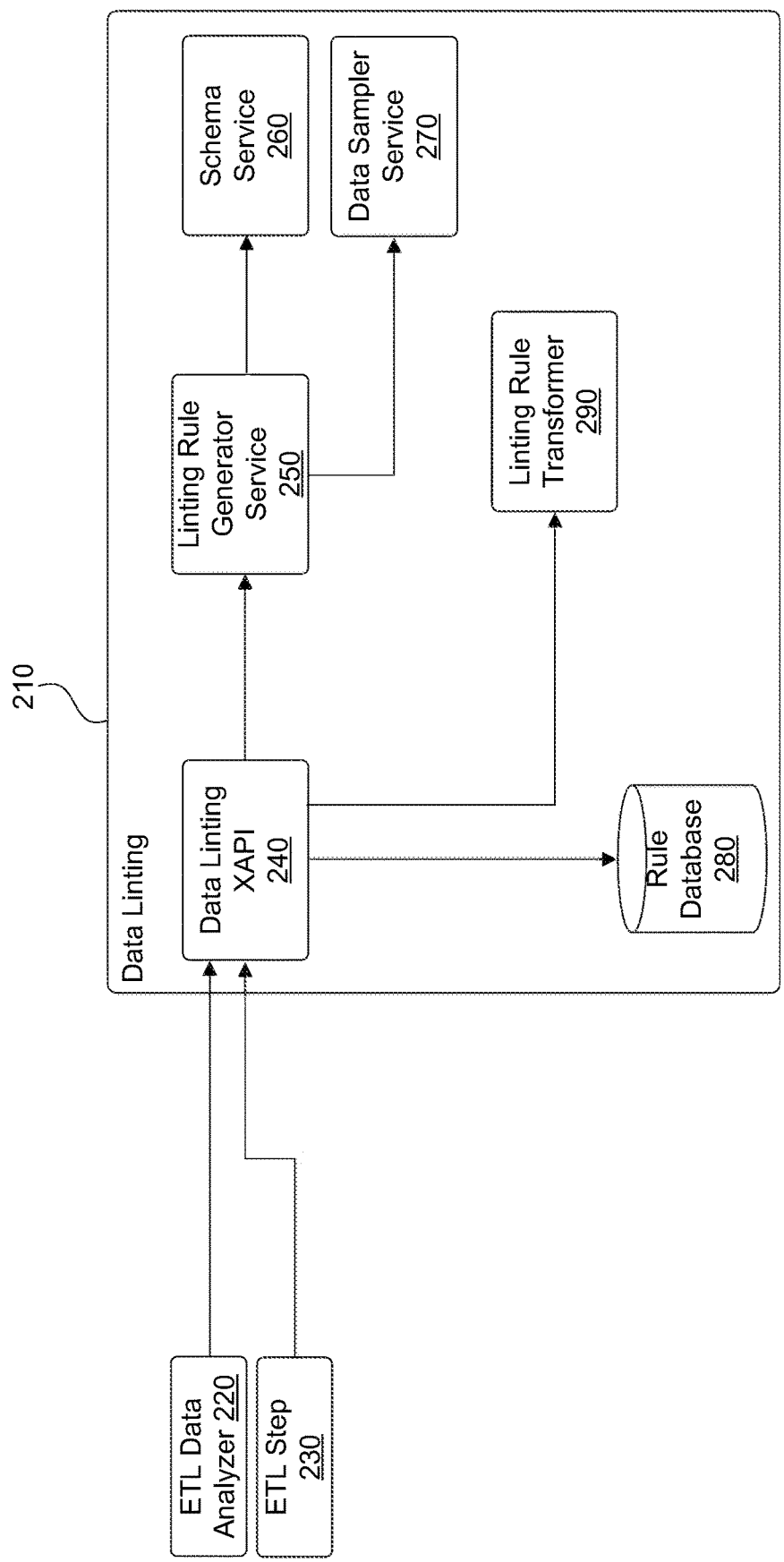
FIG. 2 illustrates a block diagram of an exemplary data linting system within an ETL pipeline according to embodiments of the present disclosure.

FIG. 2 illustrates a block diagram of an exemplary data linting system 210 within an ETL pipeline according to embodiments of the present disclosure. As shown in FIG. 2, the system 210 is connected to an ETL data analyzer 220 and an ETL step 230. The system 210 includes a data linting XAPI 240, a linting rule generator service 250, a schema service 260, a data sampler service 270, a linting rule transformer 290, and a rule database 280.

In some embodiments, the data linting XAPI 240 exposes the capabilities to the system 210 to any ETL application, such as the ETL data analyzer 220 and an ETL step 230. In some embodiments, the data linting XAPI 240 exposes capabilities to the client device 110 through a user interface.

In some embodiments, the linting rule generator service 250 generates a ruleset based on a schema created by the schema service 260 and a data sample created by the data sampler service 270. In some embodiments, the rule database 280 stores the ruleset generated by the linting rule generator service 250. In some embodiments, the linting rule transformer 290 uses the ruleset stored in the rule database 280. These elements are discussed in further detail below with respect to the figures.

In operation, the ETL data analyzer 220 and the ETL step 230 create an interface between the data linting XAPI 240 and the client device 110. The ETL data analyzer 220 and the ETL step 230 may be part of an ETL pipeline. In some embodiments, the ETL data analyzer 220 and the ETL step 230 may be part of an ELT pipeline.

The ETL step 230 sends information identifying a database to the data linting XAPI 240. In some embodiments, the database may be one of a distributed database, SQL database, NoSQL database, end-user database, object-oriented database or relational database. The ETL step 230 receives a ruleset in a specified database language from the data linting XAPI 240. In embodiments, the specific database language may be, but is not limited to, SQL, XQuery, OQL, and LINQ.

The ETL data analyzer 220 may provide the data linting XAPI 240 with a data sample from the database. In some embodiments, the ETL data analyzer 220 sends the data linting XAPI 240 a desired schema model for the database. The ETL data analyzer 220 receives rulesets in any format from the data linting XAPI 240.

In operation, the data linting XAPI 240 interfaces with the client device 110 and exposes the data linting capabilities to any ETL/ELT application, such as the ETL analyzer 220 and the ETL step 230. The data linting XAPI 240 receives information identifying a database from the client device 110 via the ETL step 230.

The data linting XAPI 240 sends the information to the linting rule generator service 250. The linting rule generator service 250 returns a validation report and a ruleset in the specified database language to the data linting XAPI 240. The data linting XAPI 240 sends the ruleset to the rule database 280. The data linting XAPI 240 sends the ruleset and the validation report to the client device 110. The data linting XAPI 240 receives a list of confirmed rules from the client device 110. The data linting XAPI 240 sends the list of confirmed rules to the rule data base 280. The rule database 280 returns a final ruleset to the data linting XAPI 240. The data linting XAPI 240 sends the final ruleset to the client device 110 via the ETL data analyzer 220.

In embodiments, the data linting XAPI 240 receives a request to transform the final ruleset into a specific database language from the client device 110. The data linting XAPI 240 requests the rule database 280 return the final ruleset. The rule database 280 returns the final ruleset to the data linting XAPI 240. The data linting XAPI 240 requests the linting rule transformer 290 to transform the final ruleset into the specified database language. The linting rule transformer 290 returns the transformed ruleset to the data linting XAPI 240. In embodiments, the data linting XAPI 240 may return the transformed ruleset to the client device 110 via the ETL data analyzer 220. In some embodiments, the data linting XAPI 240 may send the transformed ruleset to the ETL step 230.

In operation, the linting rule generator service 250 creates a ruleset based on a database. The linting rule generator service 250 receives a database from the data linting XAPI 240. The linting rule generator service 250 sends the database to the schema service 260. The linting rule generator service 250 receives a model schema from the schema service 260. The linting rule generator service 250 sends the model schema and database to the data sampler service 270. Based on the model schema, the linting rule generator 250 creates a first ruleset. The linting rule generator service 250 receives a data sample from the data sampler service 270. Based on the data sample, the linting rule generator service 250 creates a second ruleset. The linting rule generator service 250 creates a combined ruleset based on the first and second rulesets. While creating the combined ruleset, the linting rule generator determines if any of the rules in the first ruleset conflict with any of the rules in the second ruleset. Based on any conflicts, the linting rule generator service 250 creates a validation report. In some embodiments, the validation report may contain information about which rules conflict in the combined ruleset. In embodiments, the linting rule generator service 250 validates the combined ruleset with the data sample from the data sampler service 270. The linting rule generator service 250 sends the combined ruleset and the validation report to the data linting XAPI 240.

In operation, the schema service 260 creates a model schema from a database. The schema service 260 receives a database from the linting rule generator service 250. The schema service 260 determines a schema model from the database. The schema service 260 then compares the schema model from the database to a canonical model schema based on a specified database language. Based on the comparison, the schema service 260 creates a model schema. The schema service 260 sends the model schema to the linting rule generator service 250.

In operation, the data sampler service 270 creates a data sample from the database and model schema. The data sampler service 270 receives a database and model schema from the linting rule generator service 250. The data sampler service 270 creates a first data sample from the database. The data sampler service 270 determines if the first data sample is enough to represent the model schema. If the first data sample is enough to represent the model schema, the data sampler service 270 returns the first data sample to the linting rule generator service 250. If the first data sample is not enough to represent the model schema, the data sampler service 270 generates a second data sample based on the model schema and the database and then the data sampler service 270 repeats the comparison until the data sample is enough to represent the model schema.

In operation, the rule database 280 stores the ruleset for future use. The rule database 280 receives a ruleset from the data linting XAPI 240. The rule database 280 stores the ruleset. In embodiments, the data linting XAPI 240 may send the rule database 280 a list of rules to disable in the ruleset. The rule database 280 receives a request from the data linting XAPI 240 to retrieve the ruleset. The rule database 280 sends the ruleset to the data linting XAPI 240 in response to the request.

In operation, the linting rule transformer 290 transforms a ruleset based on a specified database language. The linting rule transformer 290 receives a request to transform a ruleset form the data linting XAPI 240. The request may contain the specified database language. The linting rule transformer 290 looks for an available engine to transform the ruleset into the specified database language. Once the linting rule transformer 290 has found an available engine, the engine transforms the ruleset into a transformed ruleset in the specified database language. The linting rule transformer 290 sends the transformed ruleset to the data linting XAPI 240.

Figure 3:
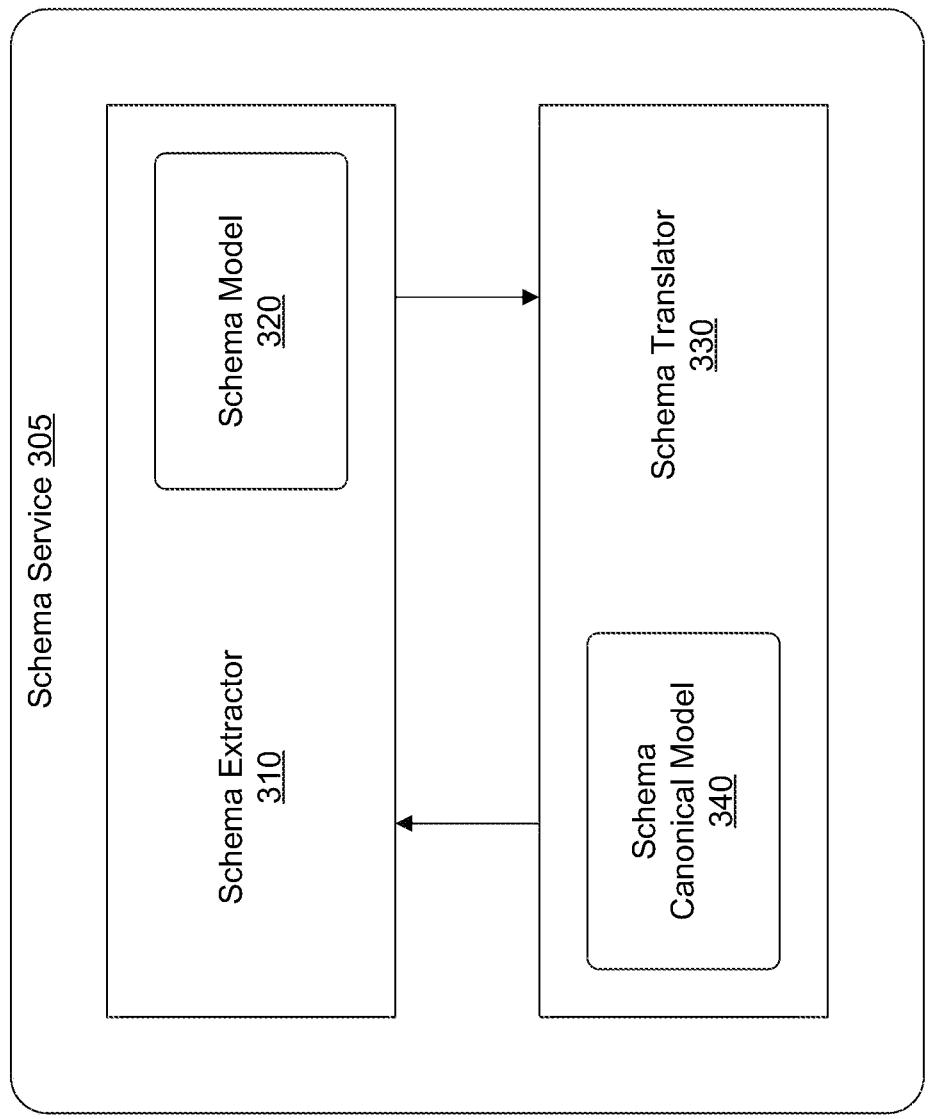
FIG. 3 illustrates a block diagram of an exemplary schema service according to embodiments of the present disclosure.

FIG. 3 illustrates a block diagram of an exemplary schema service 305 according to embodiments of the present disclosure. As shown in FIG. 3, the schema service 305 contains a schema extractor 310 and a schema translator 330. In some embodiments, the schema service 305 is the schema service 260 in FIG. 2. The schema extractor 310 creates the schema model 320 from a database. The schema extractor 330 creates a schema canonical model 340 from the schema model 320.

In operation, the schema extractor 310 determines the schema model 320 from a database or data sample. The schema extractor 310 receives a database from the linting rule generator service 250. The schema extractor 310 creates the schema model 320 from the database. The schema model 320 may define the data type definitions for the database. In some embodiments, a data type may be one or more of a number, a character, or a string. In some embodiments, a data type definition may include information further defining a data type, such as the size of the data type, sub-fields, and format within the database. In an embodiment, a data type definition for a number may include anything that defines the characteristics or bounds of the data type, such as for example that a particular data type must be a numerical value and must be seven digits long, is a character string between 4 and 7 characters long without spaces, or (e.g., for an address) a string between 10 and 50 characters that includes numerical values. A large variety of data type definitions may exist and can be customized according to types of data being stored. The schema extractor 310 sends the schema model 320 to the schema translator 330 to create the schema canonical model 340. The schema extractor 310 receives the schema canonical model 340 from the schema translator 330. The schema extractor 310 sends the schema canonical model 340 to the linting rule generator service 250.

In operation, the schema translator 330 creates the schema canonical model 340 based on the schema model 320 and a database language. The database language may be specified by the client device 110. In some embodiments, the database language may be unchangeable (e.g., hardcoded into the system instead of being determined by the user). The schema translator 330 receives the schema model 320 from the schema extractor 310. The schema translator 330 compares each data type definition in the schema model 320 to canonical data types in the database language. The schema translator 330 determines how the data type definitions in the schema model 320 compare to the canonical data types. The schema translator 330 creates the schema canonical model 340 by unifying the data type definitions in the schema model 320 and the canonical data type definitions. The schema translator 320 unifies the data type definitions by selecting only the canonical data type definitions which define to the same data type as those specified in the schema model 320 to add to the schema canonical model 340. The schema translator 330 sends the schema canonical model 340 to the schema extractor 310.

Figure 4:
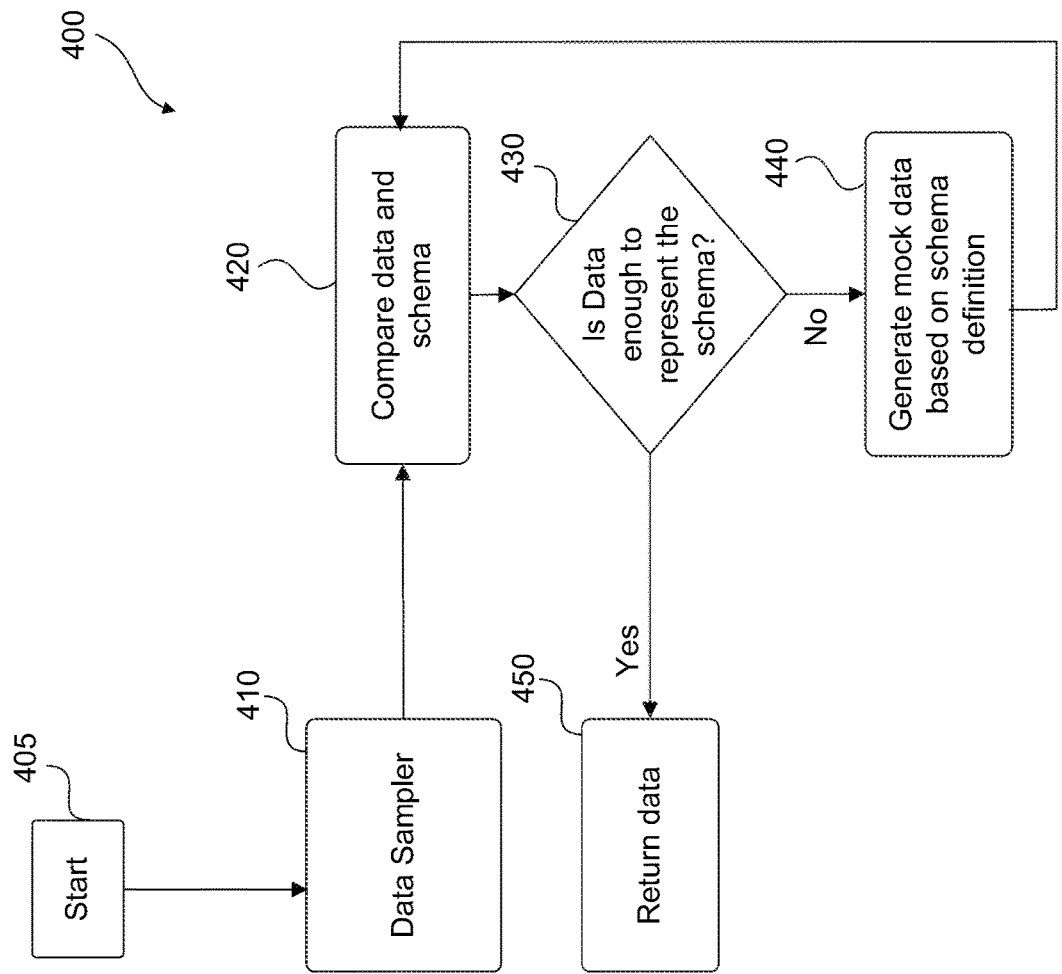
FIG. 4 illustrates a flowchart diagram of an exemplary method for data sampling according to embodiments of the present disclosure.

FIG. 4 illustrates a flowchart diagram of an exemplary method for data sampling according to embodiments of the present disclosure. In some embodiments, the method 400 may be carried out by the data sampler service 270.

In step 405, a data sampler receives a request from the linting rule generator service 250. The request may include a database and a schema. In some embodiments, the request may contain an initial data sample.

In step 410, a data sampler creates a data sample from the database. In some embodiments, the data sample may be the initial data sample.

In step 420, the data sampler compares the data sample to the schema. The data sampler determines if the data sample has at least one example of each data type in the schema. The data sampler creates a list of what data types are present in the data sample. The data sampler then compares this list to what data types are defined by the schema. In an embodiment, the schema may contain definitions for a number and a string. In the embodiment, the data sampler may determine the list of data types present in the data sample contains a number and a string. After determining if the list of data types from the data sample matches the data types defined by the schema, the data sample moves to step 430.

In step 430, the data sampler determines if the data sample is enough to represent the schema. The data sample is enough to represent the schema if it contains at least one instance of each data type defined by the schema. In some embodiments, the data sample may not contain at least one instance of each data type defined in the schema. In an embodiment, the schema may contain definitions for a number and a string. In the embodiment, the data sampler may determine the list of data types present in the data sample contains only a number. If the first data sample does not contain at least one example of each data type in the schema (430—No), the process continues to step 440.

In step 440, the data sampler creates a second data sample. The second data sample is the data sample with more information. In some embodiments, the database is big enough for the data sampler to create a second data sample. In those embodiments, the data sample creates the second data sample by selecting instances in the database that represent every data type in the schema.

In an embodiment, the database may contain numbers, characters, and strings. In the embodiment, the schema defines numbers, characters, and strings. In the embodiment, the initial data sample only contains an example of a number and a character. The data sampler determines that the initial data sample is missing an example of a string. The data sampler finds an example of a string in the database and adds it to the initial data sample to create the second data sample.

In some embodiments, the database is too small to create a second data sample. If the database is too small to create a second data sample, the data sampler creates mock data based on the model schema data type definitions. In an embodiment, the database may contain only numbers and characters. In this embodiment, the schema may define numbers, characters, and strings. In the embodiment, the initial data sample may include a number and a character. The data sampler would add a string to the initial data sample to create the second data sample.

The data sampler then returns to step 420.

Alternatively, if the first data sample does contain at least one example of each data type in the model schema, the process continues to step 450 (430—Yes). In step 450, the data sample returns the data sample to the linting rule generator service 250.

Figure 5:
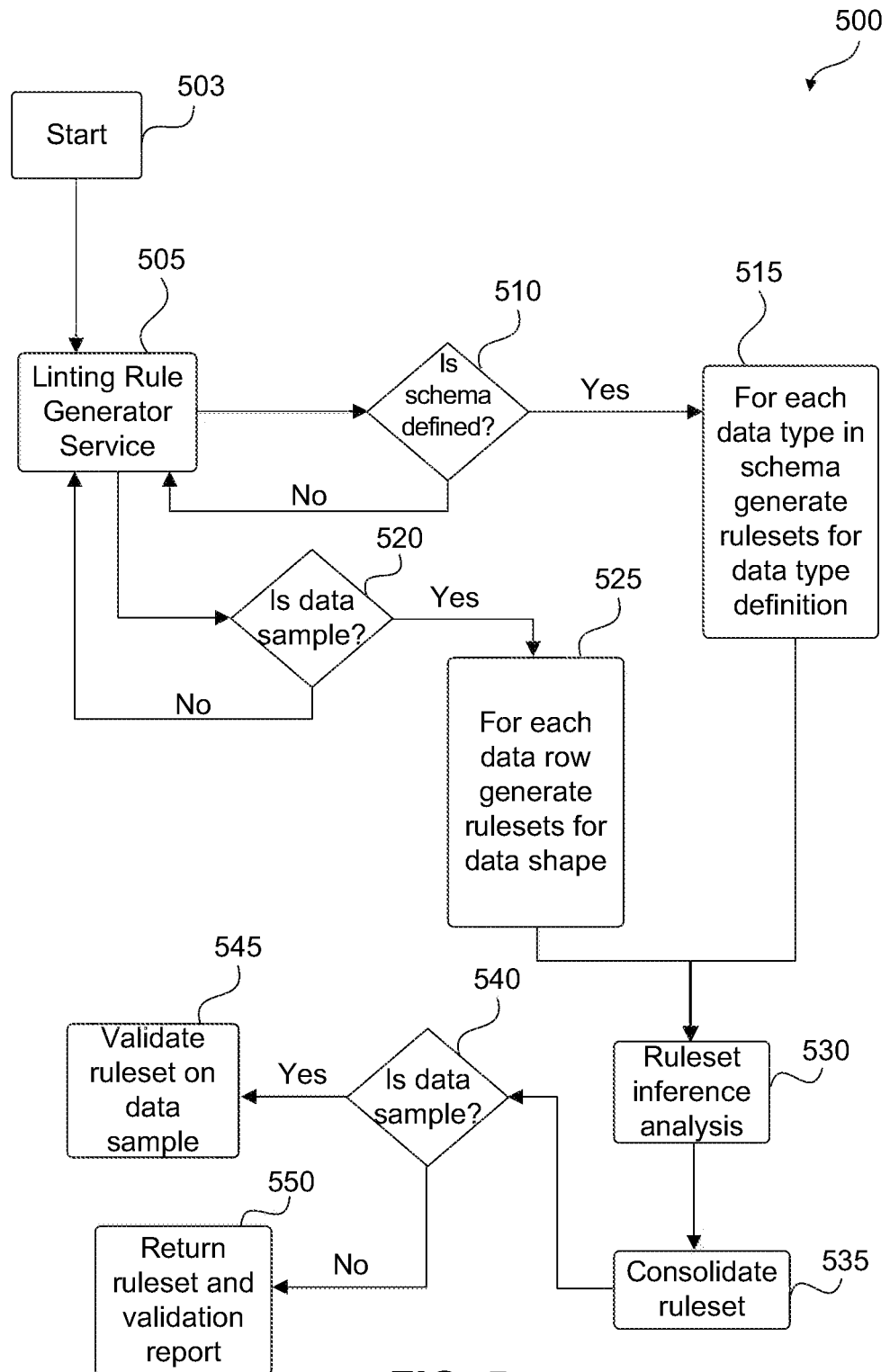
FIG. 5 illustrates a flowchart diagram of an exemplary method for generating linting rules according to embodiments of the present disclosure.

FIG. 5 illustrates a flowchart diagram of an exemplary method for generating linting rules according to embodiments of the present disclosure. In some embodiments, the method 500 may be carried out by the linting rule generator service 250.

In step 503, a linting rule generator receives a request to create a ruleset based on a database. The request may contain a schema and a data sample. The data sample contains at least one instance of each data type defined by the schema. In embodiments, the data sample may be produced by the method 400. In some embodiments, the data sample may include multiple instances of each data type defined by the schema. In some embodiments, the data sample only has one instance of each data type defined by the schema.

In step 505, the linting rule generator determines the contents of the request. If the linting rule generator determines that the request is missing the schema or the data sample, the linting rule generator waits to receive the missing schema or data type.

In step 510, the linting rule generator determines if the request includes a schema. If the request contains a schema, the method 500 continues to step 515 (510—Yes). If the request does not contain a schema, the method 500 returns to step 505 (510—No).

In step 515, based on the schema, the linting rule generator creates a data type ruleset. The linting rule generator determines a definition for each data type in the schema. The linting rule generator creates a ruleset where each rule is a definition for each data type in the schema. In an embodiment, if the first data type definition from the schema defines a seven digit numerical value, the linting rule generator adds a rule that the first data type in a database must be a number with seven digits.

In step 520, the linting rule generator determines if the request includes the data sample. If the request contains a data sample, the method 500 continues to step 525 (520—Yes). If the request does not contain a data sample, the method 500 returns to step 505 (520—No).

In step 525, based on the data sample, the linting rule generator creates a data shape ruleset. The data shape may be information about the general shape of the data, such as for example, the signs of numbers (e.g. numbers are all positive or all negative), capitalization of characters in a string (e.g. all characters are uppercase or lowercase), or (e.g., for a social security number) is a series of 3 digits, followed by a "-" followed by a series of 2 digits followed by another "-" and concluding with a series of 3 numbers. The linting rule generator looks at each element in a data row of the data sample and determines the similarities. An element in a data row may be an instance of a data type. Each rule in the data shape ruleset defines a similarity between elements in each data row. In an embodiment, the data sample may have three instances of a number in the first data row. In this embodiment, each number in the data row may be a positive number. In this embodiment, based on the numbers in the data row being all positive numbers, the linting rule generator creates a rule that the numbers in the first data row must be positive.

In step 530, the linting rule generator determines how the rules in the data type ruleset relate to the rules in the data shape ruleset to create a combined ruleset. The linting rule generator creates a combined ruleset by incorporating the data type ruleset and the data shape ruleset into one ruleset. The linting rule generator then creates a graph between the schema and the two rulesets. Using the graph, the linting rule generator analyzes how each rule in the two rulesets relate to each other. The linting rule generator infers if there is an execution order to related rules. The linting rule generator infers if related rules imply other rules. Based on the inferences and relations between rules, the linting rule generator creates a combined ruleset. The linting generator creates a validation report based on the combined ruleset. If the linting rule generator determines that two rules are related but would produce opposite outcomes, the rule generator adds a warning to the validation report which identifies the rules.

In step 535, the linting rule generator determines if there are rules in the combined ruleset that would produce the same output. The linting rule generator looks at rules that apply to the same data row and data type. From those rules, the linting rule generator determines if any of the rules would produce the same output as another rule.

The linting rule generator looks at if any rule for a data type is identical to another for the same data type and removes the duplicate. In an embodiment, a first rule declares that a numerical value must be greater than zero. In this embodiment, a second rule declares that a numerical value must be greater than zero. In this embodiment, the linting rule generator removes the second rule from the combined ruleset. In some embodiments, the linting rule generator removes the first rule from the combined ruleset instead of the second rule.

The linting rule generator determines if a pair of rules for the same data type would produce the same output. If a rule would produce the same output as another rule, the linting rule generator removes the rule. In an embodiment, the combined ruleset have a first rule and a second rule which relate to a numerical value. In this embodiment, the first rule declares that the numerical value is at most seven digits long. In this embodiment, the second rule declares that the numerical value is smaller than 9999999. In this embodiment, the linting rule generator determines that the first rule and the second rule would produce the same output and removes the second rule. In some embodiments, the linting rule generator removes the first rule in response to determining the first rule and the second rule would produce the same output.

The linting rule generator applies this step to each combination of data row and data type.

In step 540, the linting rule generator determines if the data sample is large enough to validate the combined ruleset. A data sample is considered large enough if there are multiple instances of each data type. The amount of instances of a data type may be predetermined (e.g. hardcoded into the program by the user). If the data sample is large enough, the method 500 continues to step 545 (540—Yes). If the data sample is not large enough, the method 500 continues to step 550 (540—Yes).

In step 545, the linting rule generator validates the combined ruleset on the data sample. The linting rule generator transforms the data sample using the combined ruleset. If the transformed data sample matches the data sample, the linting rule generator includes its determination in the validation report. The linting rule generator would indicate if the combined ruleset properly transformed the data sample. In some embodiments, the linting rule generator identifies the rules and data types which were not properly transformed.

In an embodiment, the data sample may include a seven digit positive number and a character string between 4 and 7 characters long without spaces. In this embodiment, the combined ruleset contains the following rules: (1) the first data type must be a positive seven digit number, (2) the second data type must be a string of characters without spaces, and (3) the length of the second data type must be between 4 and 7 characters long. In this embodiment, the linting rule generator transforms the data sample into a transformed data sample. In this embodiment, the transformed data sample would be the same as the data sample because the data sample did not contain any instance of a data type that violated the rules. In this embodiment, the linting rule generator would record on the validation report that the combined ruleset can properly transform the data sample.

In an embodiment, the data sample may include a seven digit positive number and a character string between 1 and 3 characters long without spaces. In this embodiment, the combined ruleset contains the following rules: (1) the first data type must be a positive seven digit number, (2) the second data type must be a string of characters without spaces, and (3) the length of the second data type must be between 4 and 7 characters long. In this embodiment, the linting rule generator transforms the data sample into a transformed data sample. In this embodiment, the linting rule generator would have to change the character string to be between 4 and 7 characters long from the data sample. In this embodiment, the transformed data sample would include the same seven digit positive number and a character string between 4 and 7 characters long without spaces. In this embodiment, the linting rule generator would determine that the data sample and the transformed data sample are not the same. The linting rule generator would record on the validation report that the combined ruleset cannot properly transform the character strings in the data sample.

The linting rule generator returns the combined ruleset and the validation report. In step 550, the linting rule generator returns the combined ruleset and the validation report.

Figure 6:
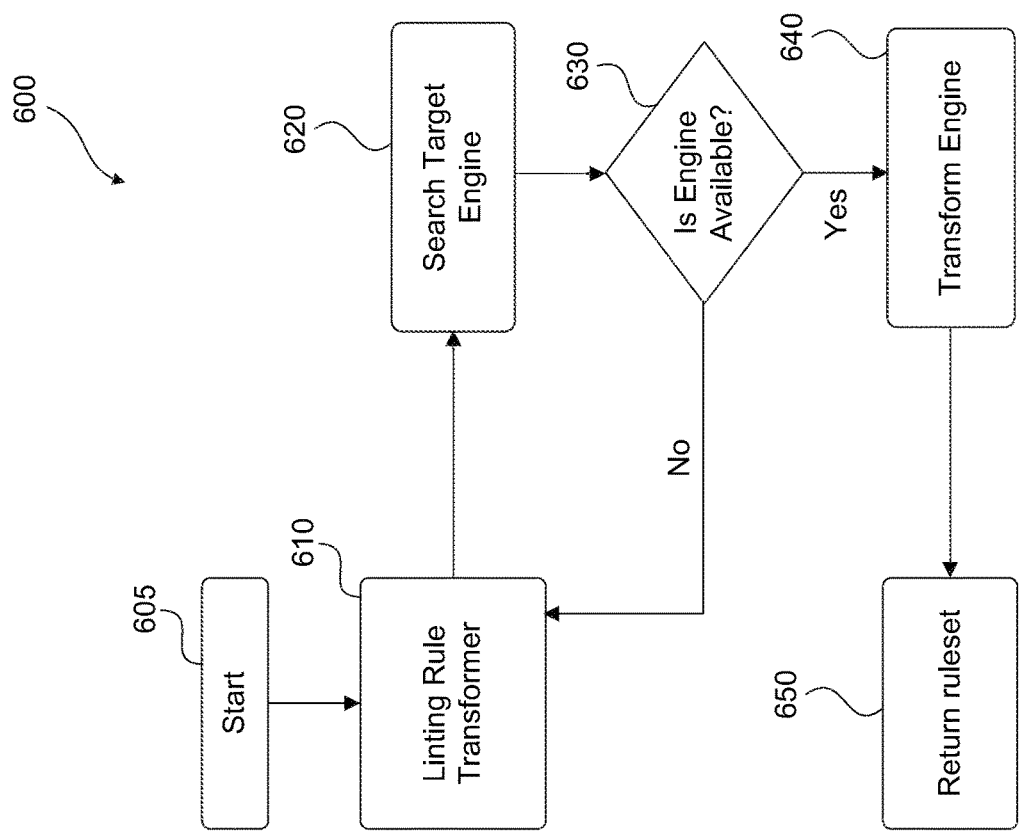
FIG. 6 illustrates a flowchart diagram of an exemplary method for transforming a linting rule according to embodiments of the present disclosure.

FIG. 6 illustrates a flowchart diagram of an exemplary method for transforming a linting rule according to embodiments of the present disclosure. In some embodiments, the method 600 may be carried out by the linting rule transformer 290.

In step 605, the method 600 begins with a request to transform a ruleset into a specified database language. The request may contain the ruleset and the specified database language. In an embodiment, a request may be a request to transform a specific ruleset into SQL language.

In step 610, a linting rule transformer determines what elements of a transformation engine would be best for transforming the ruleset. The linting rule transformer may determine the transformation engine should be specific to the database language. In some embodiments, the linting rule transformer may determine the need for other aspects in an engine, such as, but not limited to, engine availability and processing speed.

In step 620, the linting rule transformer searches for a target engine based on the elements identified in step 610. In an embodiment, the linting rule transformer may search for a target engine that only transforms rulesets into SQL. In the embodiment, the linting rule transformer looks at a list of engines and checks each engine for one that only transforms rulesets into SQL. In the embodiment, the linting rule transformer finds a target engine that only transforms rulesets into SQL.

In step 630, the linting rule transformer determines if the target engine is available to transform the ruleset into the specified database language. If the target engine is not available, the method 600 returns to step 610. If the target engine is available, the method 600 continues to step 640.

In an embodiment, the linting rule transformer has found a first target engine which fits its requirements in step 620. In the embodiment, the linting rule transformer checks if the first target engine is available. In some embodiments, this check may be a test request to transform a ruleset to the first target engine. In embodiments, the check may be a polling method of the first target engine. In the embodiment, the linting rule transformer determines that the first target engine is not available. The linting rule transformer returns to step 610 and looks for a second target engine that fits the original requirements and adds a requirement that the second target engine must be available.

In a similar embodiment, the linting rule transformer determines the first target engine is available. The linting rule transformer then moves onto step 640.

In step 640, the target engine transforms the ruleset into the specified database language. The target engine may translate the ruleset from its original database language to the specified database language. The target engine transforms the ruleset into a transformed ruleset.

In an embodiment, the target engine may need to transform a SQL ruleset into a ruleset in Python. The target engine goes through each rule in the SQL ruleset and determines what the equivalent rule is in Python. In the embodiment, the target engine knows the differences between Python and SQL for format and coding conventions. In the embodiment, the target engine creates a rule in Python and adds it to a new ruleset. The target engine repeats the translation process for every rule in the SQL ruleset. In the embodiment, the new ruleset is the ruleset in Python.

In step 650, the linting rule transformer returns the transformed ruleset to a data linting XAPI, such as the data linting XAPI 240.

Figure 7:
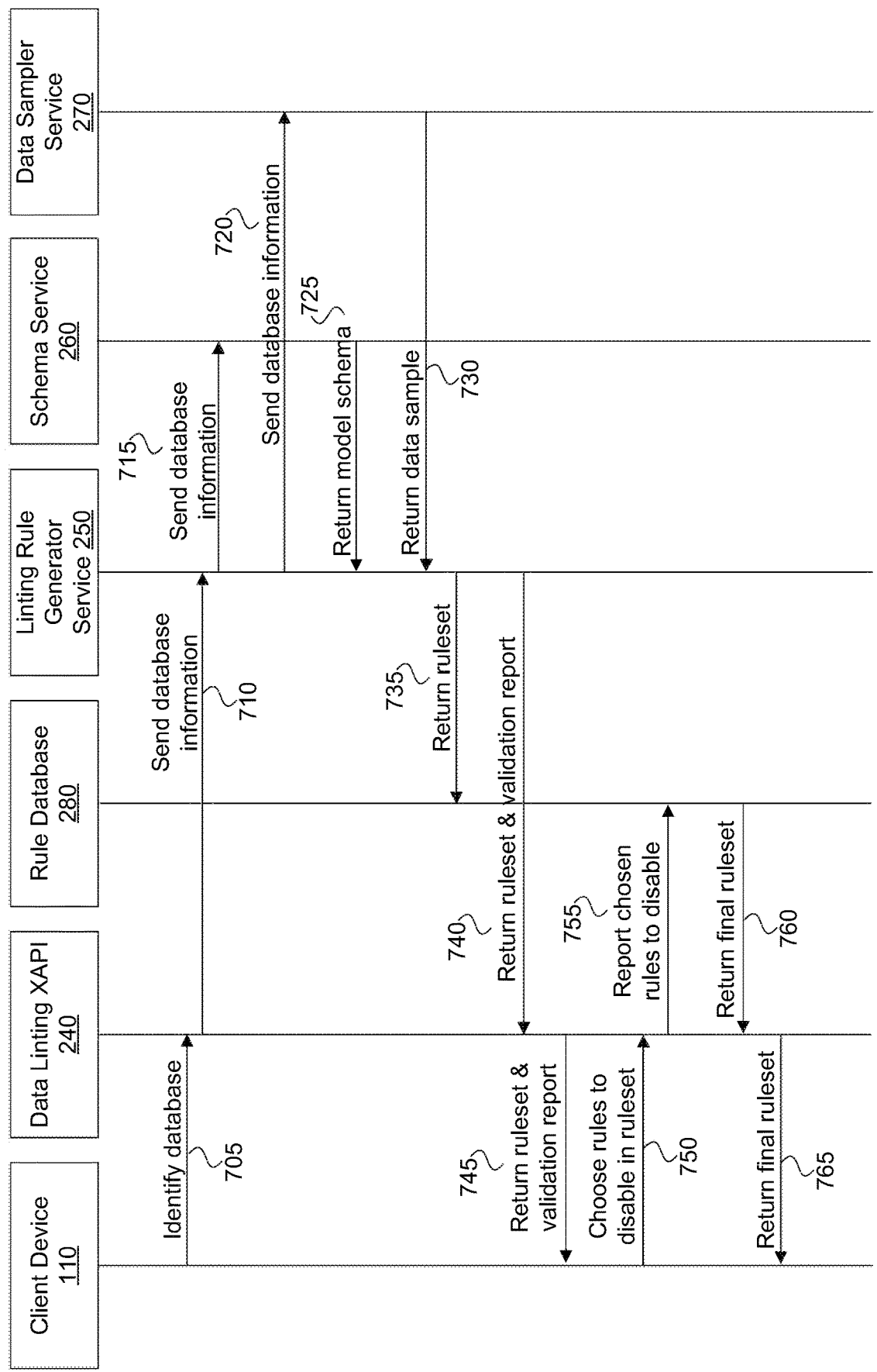
FIG. 7 illustrates a process flow diagram of an exemplary data linting system according to embodiments of the present disclosure.

FIG. 7 illustrates a process flow diagram of an exemplary data linting system according to embodiments of the present disclosure.

In step 705, the client device 110 sends a request identifying a database to the data linting XAPI 240. In some embodiments, the request includes a data sample.

In step 710, the data linting XAPI 240 sends the database information to the linting rule generator service 250.

In step 715, the linting rule generator service 250 sends the database information to the schema service 260. In response to receiving the database information, the schema service 260 creates a model schema. In some embodiments, the schema service 260 uses a method like the method 300 described in FIG. 3 to create the model schema. In embodiments, the schema service 260 uses a different method to create the model schema.

In step 720, the linting rule generator service 250 sends the database information to the data sampler service 270. In response to receiving the database information, the data sampler service 270 creates a data sample. In embodiments, the data sampler service 270 uses a method like the method 400 described in FIG. 4 to create the data sample. In some embodiments, the data sampler service 270 uses a different method to create the data sample.

In step 725, the schema service 260 returns the model schema to the linting rule generator service 250.

In step 730, the data sampler service 270 returns the data sample to the linting rule generator service 250.

In response to receiving the model schema and the data sample, the linting rule generator service 250 creates a ruleset and a validation report. In embodiments, the linting rule generator service 250 creates the ruleset and the validation report using the method 500 described in FIG. 5. In some embodiments, the linting rule generator service 250 creates the ruleset and the validation report using a different method.

In step 735, the linting rule generator service 250 returns the ruleset to the rule database 280. The rule database 280 then stores the ruleset for future use.

In step 740, the linting rule generator service 250 returns the ruleset and the validation report to the data linting XAPI 240.

In step 745, the data linting XAPI 240 returns the ruleset and the validation report to the client device 110.

In step 750, the client device 110 chooses rules to disable in the ruleset. The client device 110 sends its choices to the data linting XAPI 240.

In step 755, the data linting XAPI 240 sends the client device's 110 choices to the rule database 280. In response to receiving the choices, the rule database 280 creates a final ruleset based on the original ruleset with rules disabled based on the client device's 110 choices.

In step 760, the rule database 280 returns the final ruleset to the data linting XAPI 240.

In step 765, the data linting XAPI 240 returns the final ruleset to the client device 110.

Figure 8:
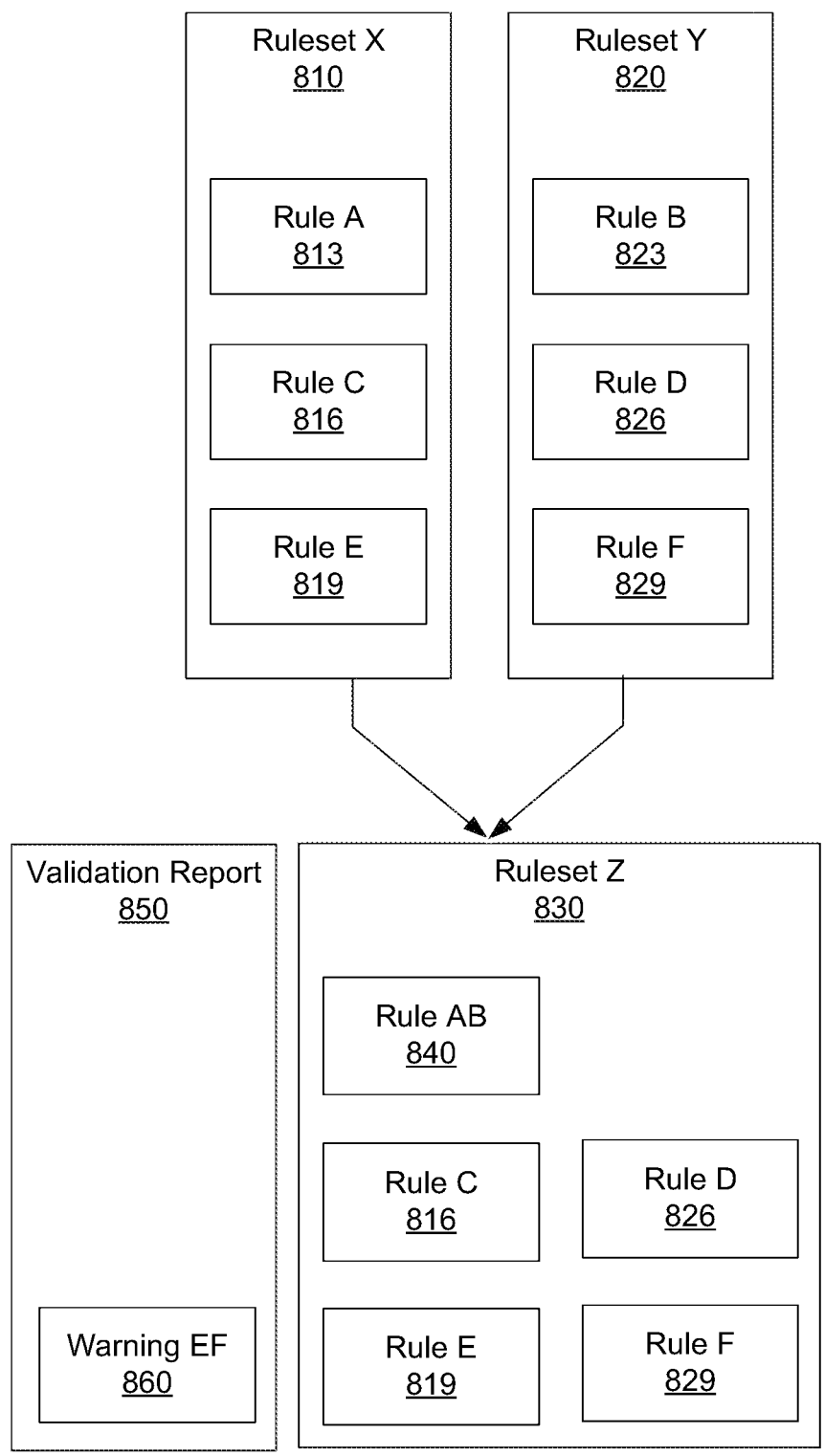
FIG. 8 illustrates a block diagram of an example linting rule generator service output.

FIG. 8 illustrates a block diagram of an example linting rule generator service output after step 535 in method 500.

Ruleset X 810 and Ruleset Y 820 are rulesets that may be created by a linting rule generator. In some embodiments, Ruleset X 810 may be a ruleset for data type definitions. In some embodiments, Ruleset X 810 may be a ruleset for data shape. In some embodiments, Ruleset Y 820 may be a ruleset for data type definition. In some embodiments, Ruleset Y 820 may be a ruleset for data shape.

Ruleset X 810 contains Rule A 813, Rule C 816, and Rule E 819. In some embodiments, Ruleset X 810 may be the result of step 525 in method 500. In embodiments, Ruleset X 810 may be the result of step 515 in method 500. In some embodiments, Rule A 813, Rule C 816, and Rule E 819 each pertain to a different data type. In some embodiments, Rule A 813 and Rule C 816 pertain to the same data type but Rule E 819 pertains to a different data type. In embodiments, Rule A 813, Rule C 816, and Rule E 819 each pertain to a different data row. In some embodiments, Rule A 813 and Rule C 816 pertain to the same data row but Rule E 819 pertains to a different data row.

Ruleset Y 820 contains Rule B 823, Rule D 826, and Rule F 829. In some embodiments, Ruleset Y 820 may be the result of step 515 of method 500. In embodiments, Ruleset Y may be the result of step 252 of method 500. In some embodiments, Rule B 823, Rule D 826, and Rule F 829 each pertain to a different data type. In some embodiments, Rule B 823 and Rule D 826 pertain to the same data type but Rule F 829 pertains to a different data type. In embodiments, Rule B 823, Rule D 826, and Rule F 829 each pertain to a different data row. In some embodiments, Rule B 823 and Rule D 826 pertain to the same data row but Rule F 829 pertains to a different data row.

Rule A 813 and Rule B 823 pertain to the same data type and data row.

Rule C 816 and Rule D 826 pertain to the same data type and data row.

Rule E 819 and Rule F 829 pertain to the same data type and data row.

Ruleset Z 830 is a ruleset created by the linting rule generator from Ruleset X 810 and Ruleset Y 820. The linting rule generator initially creates Ruleset Z 830 in step 530 of method 500. The linting rule generator finalizes Ruleset Z 830 in step 535 of method 500. Ruleset Z 830 contains Rule AB 840, Rule C 816, Rule D 826, Rule E 819, and Rule F 829.

The Validation Report 850 is the report created by the linting rule generator while it creates Ruleset Z 830 in step 530 of method 500. The Validation Report 850 contains Warning EF 860.

Rule AB 840 is the result of combining Rule A 813 and Rule B 823. In an embodiment, Rule A 813 and Rule B 823 may be rules that produce the same output. In the embodiment, Rule AB 840 is Rule A 813. In a similar embodiment, Rule AB 840 is Rule B 823. In an embodiment, Rule A 813 and Rule B 823 may be rules that can be consolidated into one rule. In the embodiment, Rule AB 840 is a combination of Rule A 813 and Rule B 823 as a result of step 530 in method 500.

Rule C 816 and Rule D 826 cannot be combined as a result of step 530 in method 500. Rule C 816 and Rule D 826 do not produce the same output. Thus, Rule C 816 and Rule D 826 are added to Rule Z 830 without change by the linting rule generator.

Rule E 819 and Rule F 829 cannot be combined as a result of step 530 in method 500. Rule E 819 and Rule F 829 do not produce the same output. Rule E 819 and Rule F 829 produce opposite outputs given the same inputs. Thus, Rule E 819 and Rule F 829 are added to Rule Z 830 without change by the linting rule generator. The linting rule generator creates Warning EF 860 and adds it to the Validation Report 850. In some embodiments, Warning EF 860 contains identifying information about Rule E 819 and Rule F 829.

Figure 9:
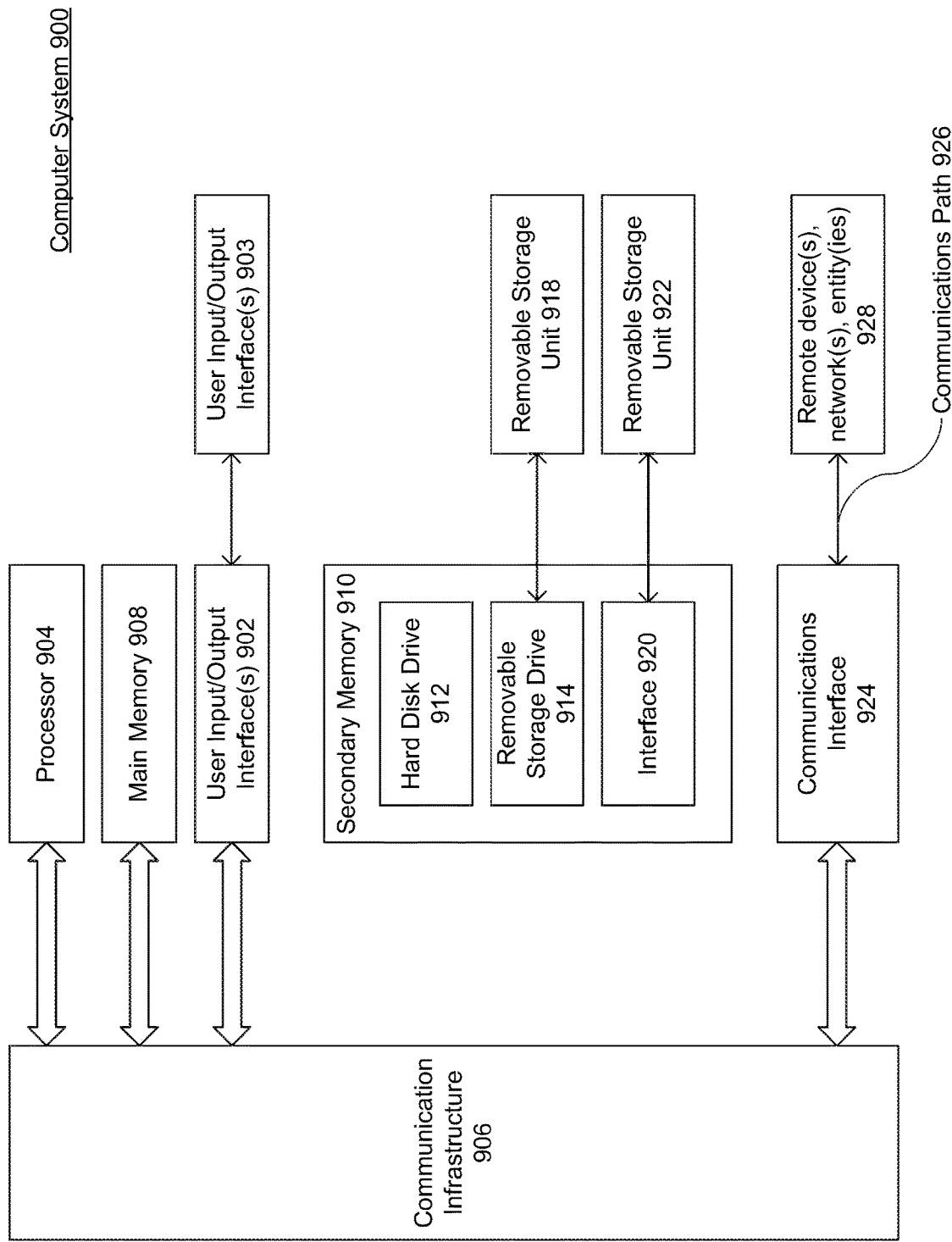
FIG. 9 illustrates a block diagram of an example computer system useful for implementing various embodiments.

Various embodiments can be implemented, for example, using one or more well-known computer systems, such as computer system 9 shown in FIG. 9. One or more computer systems 900 can be used, for example, to implement any of the embodiments discussed herein, as well as combinations and sub-combinations thereof.

Computer system 900 can include one or more processors (also called central processing units, or CPUs), such as a processor 904. Processor 904 can be connected to a communication infrastructure or bus 906.

Computer system 900 can also include customer input/output device(s) 903, such as monitors, keyboards, pointing devices, etc., which can communicate with communication infrastructure 906 through customer input/output interface(s) 902.

One or more of processors 904 can be a graphics processing unit (GPU). In an embodiment, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 900 can also include a main or primary memory 908, such as random access memory (RAM). Main memory 908 can include one or more levels of cache. Main memory 908 can have stored therein control logic (i.e., computer software) and/or data.

Computer system 900 can also include one or more secondary storage devices or memory 910. Secondary memory 910 can include, for example, a hard disk drive 912 and/or a removable storage device or drive 914. Removable storage drive 914 can be a floppy disk drive, a magnetic tape drive, a compact disk drive, an optical storage device, tape backup device, and/or any other storage device/drive.

Removable storage drive 914 can interact with a removable storage unit 918. Removable storage unit 918 can include a computer usable or readable storage device having stored thereon computer software (control logic) and/or data. Removable storage unit 918 can be a floppy disk, magnetic tape, compact disk, DVD, optical storage disk, and/any other computer data storage device. Removable storage drive 914 can read from and/or write to removable storage unit 918.

Secondary memory 910 can include other means, devices, components, instrumentalities or other approaches for allowing computer programs and/or other instructions and/or data to be accessed by computer system 900. Such means, devices, components, instrumentalities or other approaches can include, for example, a removable storage unit 922 and an interface 920. Examples of the removable storage unit 922 and the interface 920 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 can further include a communication or network interface 924. Communication interface 924 can enable computer system 900 to communicate and interact with any combination of external devices, external networks, external entities, etc. (individually and collectively referenced by reference number 928). For example, communication interface 924 can allow computer system 900 to communicate with external or remote devices 928 over communications path 926, which can be wired and/or wireless (or a combination thereof), and which can include any combination of LANs, WANs, the Internet, etc. Control logic and/or data can be transmitted to and from computer system 900 via communication path 926.

Computer system 900 can also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 can be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 can be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas can be used, either exclusively or in combination with known or open standards.

In some embodiments, a tangible, non-transitory apparatus or article of manufacture comprising a tangible, non-transitory computer useable or readable medium having control logic (software) stored thereon can also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), can cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A data linting method, comprising:
generating a first ruleset from a schema corresponding to a data format associated with a data type included in a database of a first database language, wherein the first ruleset is a data type ruleset that includes a rule for each data type definition in the database;
generating a second ruleset from a representative data sample which is representative of the schema, wherein the second ruleset is a data shape ruleset that defines rules regarding a general shape of the data included in the database;

creating a combined ruleset from a graph that specifies a relationship between the schema, the first ruleset, and the second ruleset, wherein the combined ruleset is specified in the first database language;

transforming the combined ruleset into a transformed ruleset, that preserves the relationship between the schema, the first ruleset, and the second ruleset, using conventions consistent with a second database language; and applying the transformed ruleset to the database to create a transformed database.

2. The data linting method of claim 1, wherein the schema is a result of translating the schema based on a canonical model schema, wherein the canonical model schema is a model of common data types.

3. The data linting method of claim 1, wherein generating the second ruleset from the representative data sample, includes:

extracting a first data sample from the database;
comparing the first data sample to the schema; and
generating the representative data sample from the schema in response to determining the first data sample is not representative of the schema.

4. The data linting method of claim 1, wherein generating the second ruleset from the representative data sample, includes:

extracting a first data sample from the database;
comparing the first data sample to the schema; and
determining the first data sample is the representative data sample in response to the first data sample being representative of the schema.

5. The data linting method of claim 1, wherein the first ruleset includes a first rule and the second ruleset includes a second rule, further comprising:

removing one of the first rule or the second rule from the combined ruleset, in response to determining the first rule and the second rule would transform a data type in the same way.

6. The data linting method of claim 1, wherein the first ruleset includes a first rule and the second ruleset includes a second rule, further comprising creating a validation report in response to determining the first rule would transform a data type the opposite way of the second rule, wherein the validation report identifies the first and second rules.

7. The data linting method of claim 1, wherein the first ruleset includes a first rule and the second ruleset includes a second rule, further comprising:

creating a combined rule from the first rule and the second rule in response to the first rule and the second rule relating to the same data format, wherein the first rule and the second rule would transform a data type in different ways.

8. A non-transitory, tangible computer readable medium having instructions stored thereon that, when executed by at least one computing device, cause the at least one computing device to perform operations comprising:

generating a first ruleset from a schema to correspond to a data format associated with a data type included in a database of a first database language, wherein the first ruleset is a data type ruleset that includes a rule for each data type definition in the database;

generating a second ruleset from a representative data sample which is representative of the schema, wherein the second ruleset is a data shape ruleset that defines rules regarding a general shape of the data included in the database;

creating a combined ruleset from a graph that specifies a relationship between the schema, the first ruleset, and the second ruleset, wherein the combined ruleset is specified in the first database language;

transforming the combined ruleset into a transformed ruleset, that preserves the relationship between the schema, the first ruleset, and the second ruleset, using conventions consistent with a second database language; and applying the transformed ruleset to the database to create a transformed database.

9. The non-transitory, tangible computer-readable device of claim 8, wherein the schema is a result of translating the schema based on a canonical model schema, wherein a canonical model schema is a model of common data types.

10. The non-transitory, tangible computer-readable device of claim 8, wherein generating the second ruleset from the representative data sample, includes:

extracting a first data sample from the database;
comparing the first data sample to the schema; and
generating the representative data sample from the schema in response to determining the first data sample is not representative of the schema.

11. The non-transitory, tangible computer-readable device of claim 8, wherein generating the second ruleset from the representative data sample, includes:

extracting a first data sample from the database;
comparing the first data sample to the schema; and
determining the first data sample is the representative data sample in response to the first data sample being representative of the schema.

12. The non-transitory, tangible computer-readable device of claim 8, wherein the first ruleset includes a first rule and the second ruleset includes a second rule, further comprising:

removing one of the first rule or the second rule from the combined ruleset, in response to determining the first rule and the second rule would transform a data type in the same way.

13. The non-transitory, tangible computer-readable device of claim 8, wherein the first ruleset includes a first rule and the second ruleset includes a second rule, further comprising:

creating a validation report in response to determining the first rule would transform a data type the opposite way of the second rule, wherein the validation report identifies the first and second rules.

14. The non-transitory, tangible computer-readable device of claim 8, wherein the first ruleset includes a first rule and the second ruleset includes a second rule, further comprising creating a combined rule from the first rule and the second rule in response to the first rule and the second rule relating to the same data format, wherein the first rule and the second rule would transform a data type in different ways.

15. A data linting device comprising:

a transceiver configured to send and receive signals; and
one or more processors configured to:
receive a request via the transceiver that requests creation of a ruleset based on a database;
generating a first ruleset from a schema to correspond to a data format associated with a data type included in a database of a first database language, wherein the first ruleset is a data type ruleset that includes a rule for each data type definition in the database;

generating a second ruleset from a representative data sample which is representative of the schema, wherein the second ruleset is a data shape ruleset that defines rules regarding a general shape of the data included in the database;

creating a combined ruleset from a graph that specifies a relationship between the schema, the first ruleset, and the second ruleset, wherein the combined ruleset is specified in the first database language;

transforming the combined ruleset into a transformed ruleset, that preserves the relationship between the schema, the first ruleset, and the second ruleset, using conventions consistent with a second database language; and applying the transformed ruleset to the database to create a transformed database.

16. The data linting device of claim 15, wherein operations further comprise translating the schema based on a canonical model schema, wherein a canonical model schema is a model of common data types.

17. The data linting device of claim 15, wherein operations for generating a second ruleset from a representative data sample further comprise:

extracting a first data sample from the database;

comparing the first data sample to the schema; and generating the representative data sample from the schema in response to determining the first data sample is not representative of the schema.

18. The data linting device of claim 15, wherein operations for generating a second ruleset from a representative data sample further comprises:

extracting a first data sample from the database;

comparing the first data sample to the schema; and determining the first data sample is the representative data sample in response to the first data sample being representative of the schema.

19. The data linting device of claim 15, wherein the first ruleset includes a first rule and the second ruleset includes a second rule, further comprising:

removing one of the first rule or the second rule from the combined ruleset, in response to determining the first rule and the second rule would transform a data type in the same way.

20. The data linting device of claim 15, wherein the first ruleset includes a first rule and the second ruleset includes a second rule, further comprising:

creating a validation report in response to determining the first rule would transform a data type the opposite way of the second rule, wherein the validation report identifies the first and second rules.

21. The data linting device of claim 15, wherein the first ruleset includes a first rule and the second ruleset includes a second rule, further comprising creating a combined rule from the first rule and the second rule in response to the first rule and the second rule relating to the same data format, wherein the first rule and the second rule would transform a data type in different ways.

* * * * *

UNITED STATES PATENT AND TRADEMARK OFFICE
CERTIFICATE OF CORRECTION

Page 1 of 1

PATENT NO. : 12,277,133 B2
APPLICATION NO. : 18/080268
DATED : April 15, 2025
INVENTOR(S) : Manzano et al.

It is certified that error appears in the above-identified patent and that said Letters Patent is hereby corrected as shown below:

In the Claims

In Column 15, Claim 6, Line 44, delete "comprising" and insert -- comprising: --, therefor.

In Column 16, Claim 14, Line 53, delete "comprising" and insert -- comprising: --, therefor.

Signed and Sealed this
Twenty-seventh Day of May, 2025

Coke Morgan Stewart
*Acting Director of the United States Patent and Trademark Office*